United States Patent
Chu et al.

(10) Patent No.: US 11,443,189 B2
(45) Date of Patent: Sep. 13, 2022

(54) HYPERNETWORK TRAINING METHOD AND DEVICE, ELECTRONIC DEVICE AND STORAGE MEDIUM

(71) Applicant: Beijing Xiaomi Intelligent Technology Co., Ltd., Beijing (CN)

(72) Inventors: Xiangxiang Chu, Beijing (CN); Bo Zhang, Beijing (CN); Ruijun Xu, Beijing (CN); Bin Wang, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 420 days.

(21) Appl. No.: 16/828,427

(22) Filed: Mar. 24, 2020

(65) Prior Publication Data
US 2021/0142166 A1    May 13, 2021

(30) Foreign Application Priority Data
Nov. 12, 2019    (CN) .......................... 201911102261.3

(51) Int. Cl.
*G06N 3/08* (2006.01)
*G06N 3/04* (2006.01)

(52) U.S. Cl.
CPC ............... *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| 11,030,523 B2* | 6/2021 | Zoph | G06N 3/0445 |
| 11,069,033 B2* | 7/2021 | Fang | G06N 3/04 |
| 2020/0143227 A1* | 5/2020 | Tan | G06N 3/084 |
| 2020/0387795 A1 | 12/2020 | Chu et al. | |
| 2021/0264240 A1* | 8/2021 | Singh | G06N 3/084 |

(Continued)

FOREIGN PATENT DOCUMENTS

| CN | 110288084 A | 9/2019 |
| EP | 3 748 547 A1 | 12/2019 |

(Continued)

OTHER PUBLICATIONS

Liu, Hanxiao, Karen Simonyan, and Yiming Yang. "Darts: Differentiable architecture search." arXiv preprint arXiv:1806.09055 (2018). (Year: 2018).*

(Continued)

*Primary Examiner* — Utpal D Shah
(74) *Attorney, Agent, or Firm* — Finnegan, Henderson, Farabow, Garrett & Dunner, L.L.P.

(57) ABSTRACT

A hypernetwork training method includes: acquiring a multipath neural subnetwork based on a preconstructed initial hypernetwork; training the multipath neural subnetwork to update a weight parameter of each substructure in the multipath neural subnetwork; synchronizing the weight parameter of each substructure in the multipath neural subnetwork to the preconstructed initial hypernetwork; and determining whether the preconstructed initial hypernetwork converges, and if it is determined that the preconstructed initial hypernetwork does not converge, re-executing the acquiring, the training, the synchronizing, and the determining, to obtain a target hypernetwork.

20 Claims, 10 Drawing Sheets

(56) References Cited

U.S. PATENT DOCUMENTS

| | | | |
|---|---|---|---|
| 2022/0092416 A1* | 3/2022 | Houlsby | G06N 3/084 |
| 2022/0171940 A1* | 6/2022 | Guo | G06F 40/20 |

FOREIGN PATENT DOCUMENTS

| | | |
|---|---|---|
| JP | 2018018451 A | 2/2018 |
| WO | WO 2019/106619 A1 | 6/2019 |

OTHER PUBLICATIONS

Brock, Andrew, et al. "Smash: one-shot model architecture search through hypernetworks." arXiv preprint arXiv:1708.05344 (2017). (Year: 2017).*

Guo, Z., et al., "Single Path One-Shot Neural Architecture Search with Uniform Sampling", arXiv:1904.00420v3, 14 pages, Apr. 6, 2019.

Notification of Reason for Refusal of Korean Application No. 10-2020-0036528, dated Sep. 28, 2021.

Cho, Minsu et al., "One-shot neural architecture search via compressive sensing", dated Jun. 7, 2019. retrieved on Jun. 9, 2021 from the Internet: <URL: https://arxiv.org/pdf/1906.02869.pdf>.

Haokui Zhang et al.: "IR-NAS:Neural Architecture Search for Image Restoration", arxiv.org, Cornell University Library, 201 Olin Library Cornell University, Ithaca, NY 14853, Sep. 18, 2019.

Phan Kien Tuong et al.: "DropCircuit: A Modular Regularizer for Parallel Circuit Networks", Neural Processing Letters, Kluwer Academic Publishers, Norwell, MA, US, vol. 47, No. 3, Jul. 22, 2017, pp. 841-858.

Sylwester Klocek et al.: "Multi-task hypernetworks", arxiv.org, Cornell University Library, 201 Olin Library Cornell University, Ithaca, NY 14853, Feb. 27, 2019.

Bender, Gabriel et al., "Understanding and simplifying one-shot architecture search," Proceedings of the 35th International Conference on Machine Learning, Stockholm, Sweden, PMLR 80, 2018, retrieved on Jun. 9, 2021 from the Internet: <URL: http://proceedings.mlr.press/v80/bender18a/bender18a.pdf>.

First Office Action in Japanese Application No. 2020-069754, dated Jun. 15, 2021.

Extended European Search Report in European Application No. 20166225.1, dated Apr. 29, 2021.

Xiangxiang Chu et al., FairNAS: Rethinking Evaluation Fairness of Weight Sharing Neural Architecture Search, Mar. 10, 2020, 23 pages.

* cited by examiner

HYPERNETWORK TRAINING METHOD AND DEVICE, ELECTRONIC DEVICE AND STORAGE MEDIUM

CROSS-REFERENCE TO RELATED APPLICATION

This application is based upon and claims priority to Chinese Patent Application No. 201911102261.3 filed on Nov. 12, 2019, the content of which is incorporated herein by reference in its entirety.

TECHNICAL FIELD

The present disclosure generally relates to the technical field of deep learning, and more particularly, to a hypernetwork training method and device, an electronic device and a storage medium.

BACKGROUND

Neural architecture search (NAS) is generally implemented by a single-path neural subnetwork. That is, only one subportion is sampled in each layer of a hypernetwork, the sampled subportions may be sequentially connected in series to form a single-path neural subnetwork, then a parameter of the subportion of each layer may be shared in the hypernetwork, later on, single-operation training may be performed on the single-path neural subnetwork, and after the single-path neural subnetwork is trained, the parameter of each subportion may be shared with the hypernetwork. In such a manner, the operations of sampling, parameter sharing, single-step training, and parameter updating may be cyclically executed till training convergence of the hypernetwork is achieved.

In such a NAS solution, only one substructure can be sampled in each layer of each single-path neural subnetwork trained by sampling to ensure fairness of the sampled subportions. However, a representation capability of a neural network may be restricted.

SUMMARY

According to a first aspect of embodiments of the present disclosure, a hypernetwork training method includes: acquiring a multipath neural subnetwork based on a preconstructed initial hypernetwork; training the multipath neural subnetwork to update a weight parameter of each substructure in the multipath neural subnetwork; synchronizing the weight parameter of each substructure in the multipath neural subnetwork to the preconstructed initial hypernetwork; and determining whether the preconstructed initial hypernetwork converges, and if it is determined that the preconstructed initial hypernetwork does not converge, re-executing the acquiring, the training, the synchronizing, and the determining, to obtain a target hypernetwork.

According to a second aspect of the embodiments of the present disclosure, an electronic device includes: a processor; and a memory configured to store instructions executable by the processor, wherein the processor is configured to: acquire a multipath neural subnetwork based on a preconstructed initial hypernetwork; train the multipath neural subnetwork to update a weight parameter of each substructure in the multipath neural subnetwork; synchronize the weight parameter of each substructure in the multipath neural subnetwork to the preconstructed initial hypernetwork; and determine whether the preconstructed initial hypernetwork converges, and if it is determined that the preconstructed initial hypernetwork does not converge, re-execute the acquiring, the training, the synchronizing, and the determining, to obtain a target hypernetwork.

According to a third aspect of the embodiments of the present disclosure, a non-transitory computer-readable storage medium has stored thereon instructions that, when executed by a processor of a device, cause the device to perform the method in the first aspect.

The technical solutions provided by embodiments of the present disclosure may have beneficial effects.

In the embodiments of the present disclosure, a multipath neural subnetwork may be acquired, then the multipath neural subnetwork may be trained to update a weight parameter of each substructure, subsequently, the weight parameter of each substructure in the multipath neural subnetwork may be synchronized to the preconstructed initial hypernetwork, and in a case that the hypernetwork converges, training may be ended and the target hypernetwork may be obtained. In such a manner, in a case that a representation capability of one path is limited, the hypernetwork may be trained by the multipath neural subnetwork, so that a representation capability of the hypernetwork is improved.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses consistent with aspects related to the present disclosure as recited in the appended claims.

Terms used in the present disclosure is for the purpose of describing exemplary embodiments only and is not intended to limit the present disclosure. For example, the term "and/or" used herein is intended to include any or all possible combinations of one or more of the associated listed items. The terms "first," "second," and similar terms used herein are not to represent any sequence, number or importance but only to distinguish different parts. The term "connect" is not limited to a physical or mechanical connection, and may include electrical connection, either direct or indirect.

Figure 1:
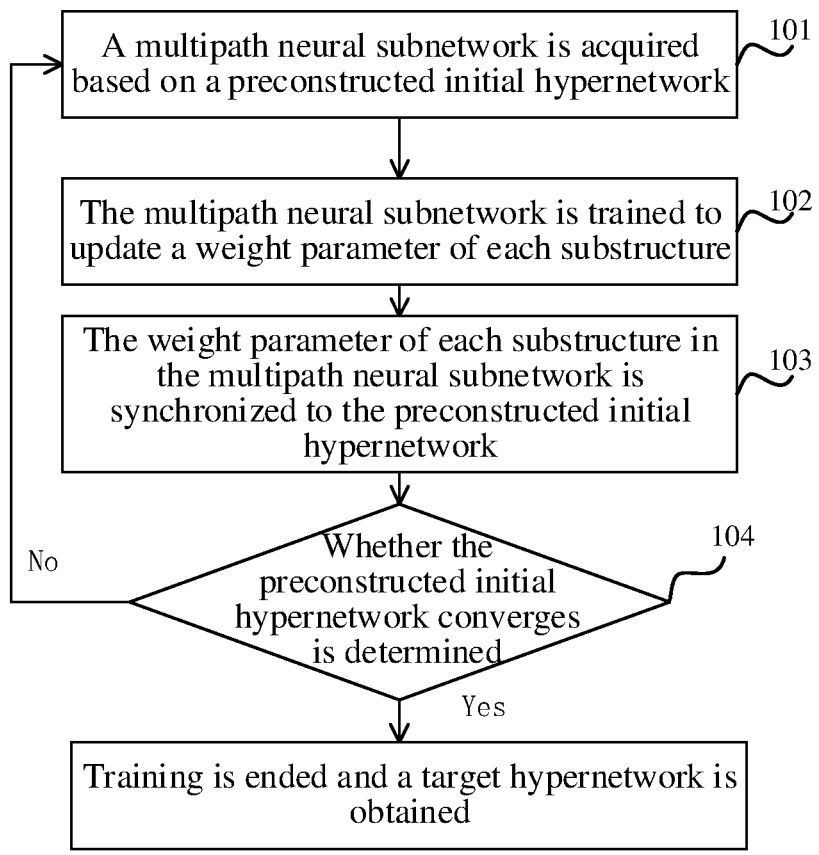
FIG. 1 is a flowchart showing a hypernetwork training method according to an exemplary embodiment.

FIG. 1 is a flowchart showing a hypernetwork training method according to an exemplary embodiment. The hypernetwork training method may be applied to at least one of the following target scenarios: image classification, target detection, semantic segmentation, text to speech, natural language translation and speech enhancement, which is not limited in the present disclosure. Referring to FIG. 1, the hypernetwork training method may include the following operations.

In operation 101, a multipath neural subnetwork is acquired based on a preconstructed initial hypernetwork.

Figure 2:
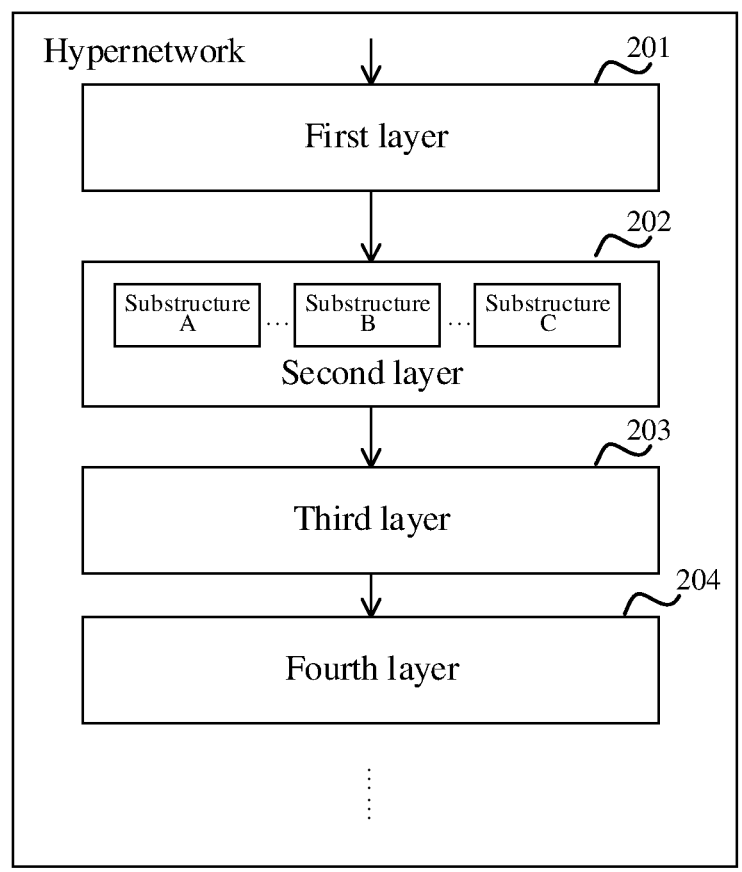
FIG. 2 is a schematic diagram of a hypernetwork according to an exemplary embodiment.

In an embodiment, a hypernetwork may be preconstructed, as shown in FIG. 2. The hypernetwork may be a network including all network structure search spaces. The hypernetwork may include multiple layers, such as a first layer 201, a second layer 202, a third layer 203, and a fourth layer 204, and each layer may include multiple selectable substructures. For illustrative purposes, FIG. 2 only shows first four layers of the hypernetwork, and the second layer 202 includes substructure A, substructure B and substructure C.

Each substructure may include one or more types of optional operators, for example, convolution and pooling. Each type of operator may include hyper-parameters (for example, a convolution size and a convolution step length) and weight parameters. In some embodiments, the hypernetwork may be constructed according to a construction method in the related art.

After the hypernetwork is constructed, values of the weight parameters thereof may be initialized by an initialization method, for example, zero initialization, random initialization or He initialization in the related art, which is not limited in the present disclosure. For the hypernetwork, weight parameters obtained by previous training may also be adopted as initialized values of weight parameters obtained by present training, and in such a manner, an initialized hypernetwork, i.e., the preconstructed initial hypernetwork, may be obtained.

Figure 3:
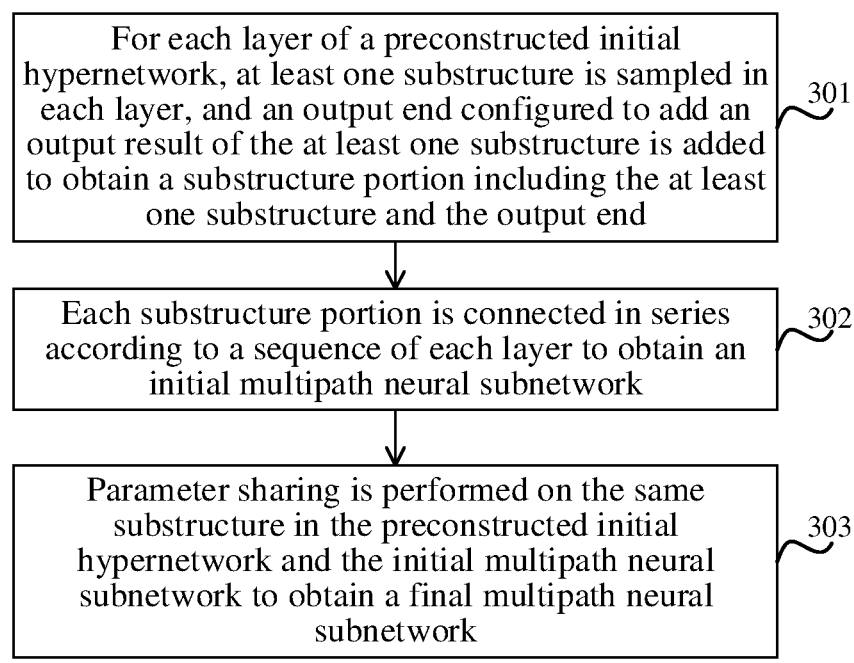
FIG. 3 is a flowchart showing a method for acquiring a multipath neural subnetwork according to an exemplary embodiment.

In an embodiment, the multipath neural subnetwork may be acquired based on the preconstructed initial hypernetwork. FIG. 3 is a flowchart showing a method for acquiring a multipath neural subnetwork according to an exemplary embodiment. Referring to FIG. 3, in operation 301, for each layer of the preconstructed neural hypernetwork, at least one substructure may be sampled in each layer, and an output end configured to add an output result of the at least one substructure may be added to obtain a substructure portion that includes the at least one substructure and the output end. For illustrative purposes, in the embodiment, at least one substructure and an output end are described as a substructure portion. In a practical application, no additional operation is needed for division of the substructure portion.

In some embodiments, in a training process, sampling a substructure in a layer is independent from sampling a substructure in another layer, and sampling of each substructure in the same layer may be also independent. In the example, a Bernoulli sampling method is adopted, and each substructure may be activated or not activated at an equal probability, namely a substructure has two states, i.e., sampled or not sampled, in a sampling process, so that sampling fairness of each substructure can be ensured, and stability of a training effect can further be ensured.

Figure 4:
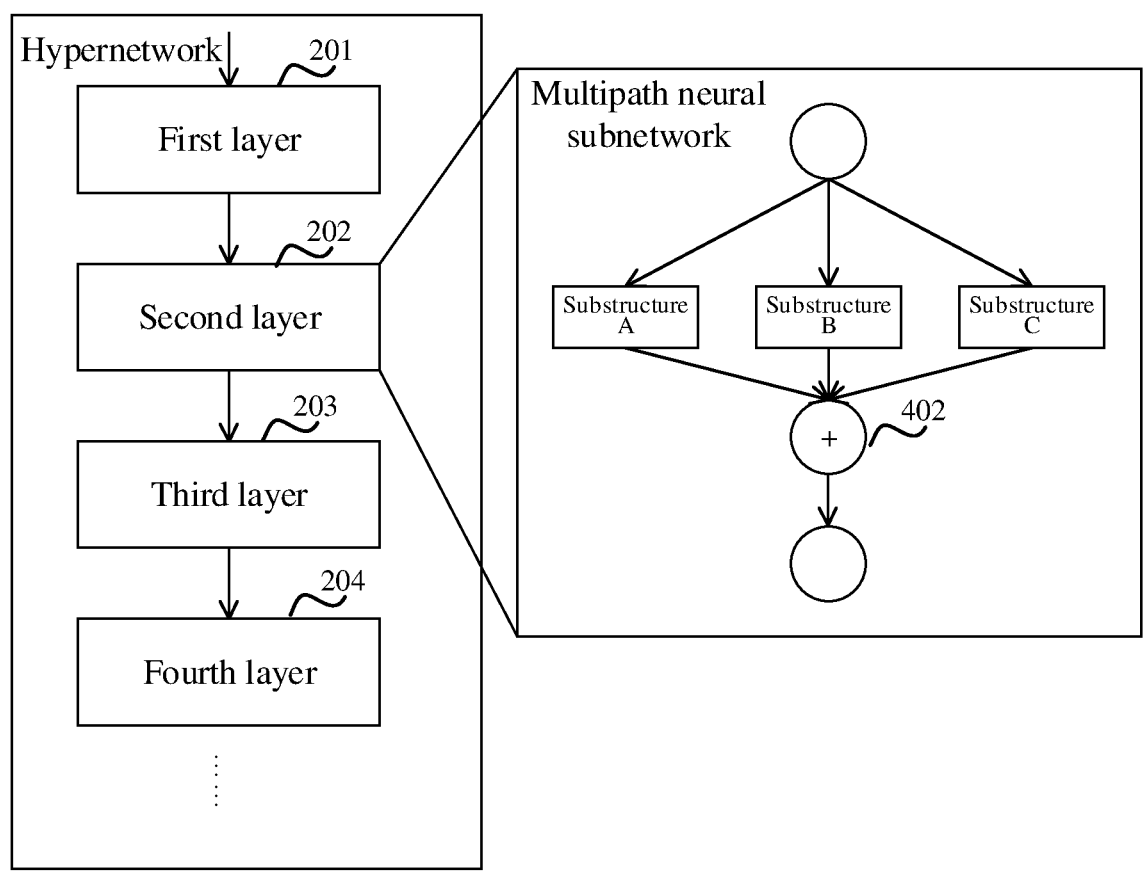
FIG. 4 is a schematic diagram illustrating a sampled substructure according to an exemplary embodiment.

Referring to FIG. 4, for example, three substructures, i.e., the substructure A, the substructure B and the substructure C, may be sampled from the second layer 202, and outputs of the three substructures may be connected to an output end 402, which is represented with "+" in FIG. 4. The output end 402 may add output results of the three substructures, and an addition result may be determined as input data of each substructure in a next layer, so that a dimension of input data of each layer may be reduced, and a calculated amount may be reduced.

In the embodiment, dimensions of output data of substructures in the same layer can be theoretically the same, and when the dimensions are different, preset values (for example, 0) may be added to the low dimensions to enable all the substructures in the same layer to have the same dimension, thereby ensuring an addition effect of the data in the same layer. Considering a function of a convolution kernel for increasing or decreasing a dimension, a 1*1 convolution kernel may also be set on each substructure to keep the same dimension of the output data of all the substructures. The corresponding solution falls within the scope of protection of the present disclosure.

Referring back to FIG. 3, in operation 302, each substructure portion may be connected in series according to a sequence of each layer to obtain an initial multipath neural subnetwork. In an embodiment, the substructures in each layer may be connected to the output end of the substructure portion of the upper layer respectively, namely the input data of each substructure in the same layer is the same. It can be understood that, since each layer includes at least one substructure, the subnetwork formed by series connection may include multiple paths from an input end to an output end and is called a multipath neural subnetwork.

Figure 5:
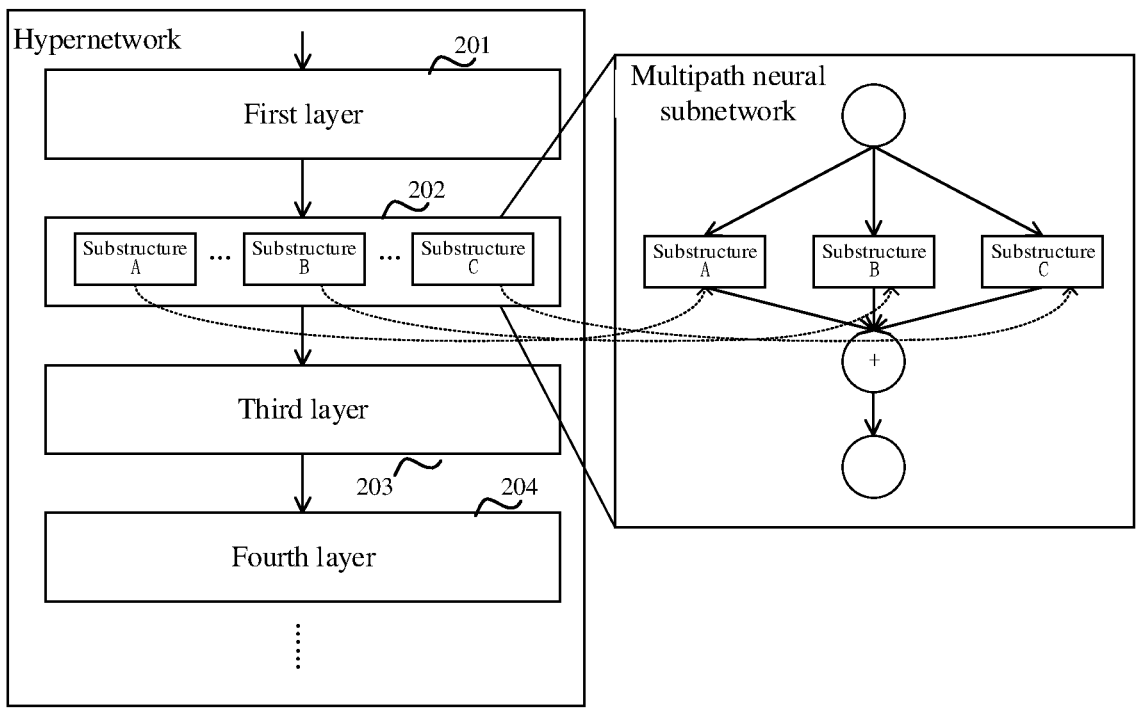
FIG. 5 is a schematic diagram illustrating parameter sharing according to an exemplary embodiment.

In operation 303, parameter sharing may be performed on the same substructure in the preconstructed initial hypernetwork and the initial multipath neural subnetwork to obtain a final multipath neural subnetwork. Parameter sharing refers to that a weight parameter of each substructure in the multipath neural subnetwork is the same as a weight parameter of the corresponding substructure in the hypernetwork. Referring to FIG. 5, in a parameter sharing process, the weight parameter of the substructure A in the second layer of the hypernetwork may be shared with the substructure A in the second layer of the multipath neural subnetwork, the weight parameter of the substructure B in the second layer of the hypernetwork may be shared to the substructure B in the second layer of the multipath neural subnetwork, and the weight parameter of the substructure C in the second layer of the hypernetwork may be shared to the substructure C in the second layer of the multipath neural subnetwork. The operation may be repeated to assign values to the weight parameters of all the substructures in the multipath neural subnetwork.

Referring back to FIG. 1, in operation 102, the multipath neural subnetwork is trained to update a weight parameter of each substructure.

In an embodiment, a training set may be preset, the training set including a certain number of training samples. The certain number may be set according to a specific scenario to be, for example, tens of thousands to hundreds of thousands, which is not limited in the present disclosure. In an embodiment, the training samples in the training set may be grouped, each group including a first number of training samples and the first number being thousands, so that the number of samples for training each time can be reduced and the training efficiency can be improved. In an embodiment, training may be performed on all the samples in the training set to complete a round of training, which is also referred to as an epoch. If the training set includes 20,000 training samples and a batch size (a group size) is 100, then a batch number (the number of groups) of the training set is 20,000/100=200, so that the batch number required in each epoch is 200. That is, each multipath neural subnetwork requires 100 training samples, and 200 multipath neural subnetworks are trained to complete an epoch.

Figure 6:
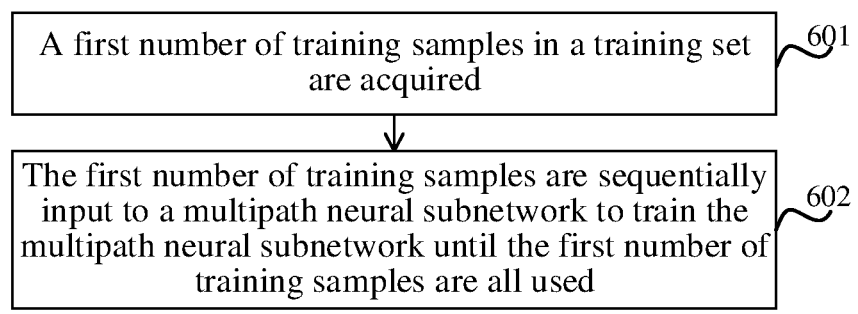
FIG. 6 is a flowchart showing a method for training a multipath neural subnetwork according to an exemplary embodiment.

In an embodiment, training, for example, single-step training, may be performed on the multipath neural subnetwork by use of the training samples. FIG. 6 is a flowchart showing a method of training a multipath neural subnetwork according to an exemplary embodiment. Referring to FIG. 6, in operation 601, a first number of training samples in the training set may be acquired, and in operation 602, the first number of training samples are sequentially input to the multipath neural subnetwork to train the multipath neural subnetwork until the first number of training samples are all used. In the embodiment, training of the multipath neural subnetwork may only use part of the training samples in the training set, as long as the weight parameter of each substructure can change, so that training time may be shortened. Moreover, when the multipath neural subnetwork is trained, it is unnecessary to ensure convergence of the multipath neural subnetwork, which is also favorable for saving the training time and improving the training efficiency.

It is to be noted that different multipath neural subnetworks may be trained by different training samples. For example, the training set may be divided into 10 groups, each multipath neural subnetwork may be trained by use of one group of training samples, and under the circumstance that training times are enough, each path may be fully trained, so that the representation capability of the hypernetwork is improved. In addition, after the hypernetwork converges, the representation capability of the sampled multipath neural subnetwork is also higher than that of a multipath neural subnetwork in the related art.

Referring back to FIG. 1, in operation 103, the weight parameter of each substructure in the multipath neural subnetwork is synchronized to the preconstructed initial hypernetwork.

Figure 7:
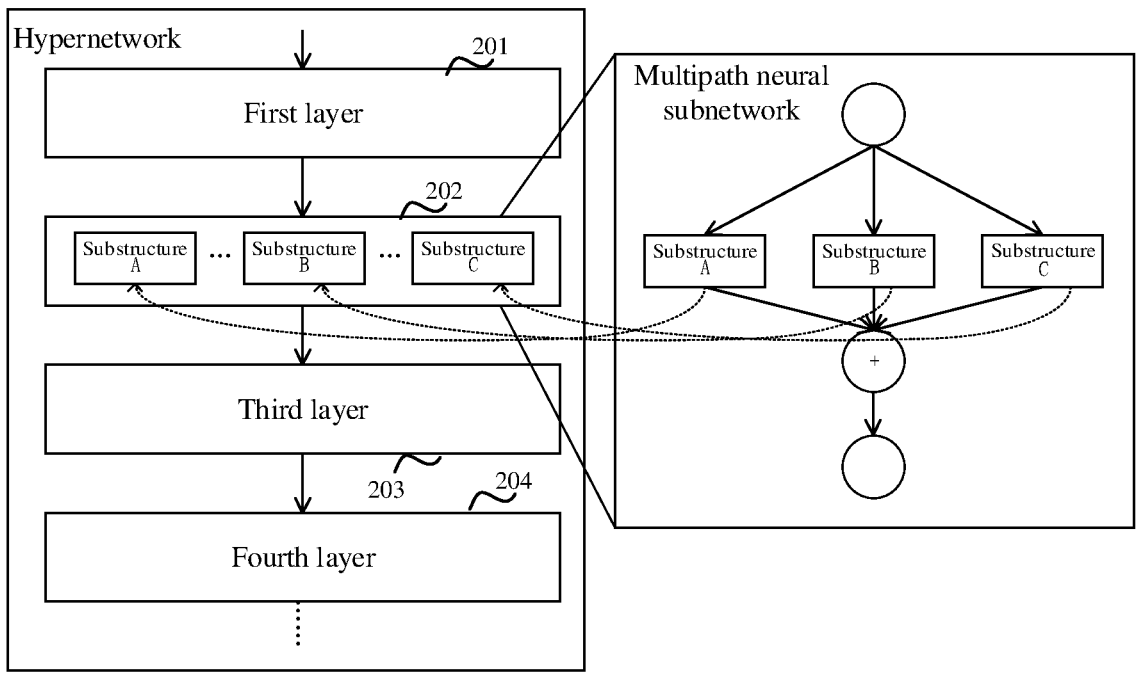
FIG. 7 is a schematic diagram illustrating synchronization of a weight parameter to a hypernetwork according to an exemplary embodiment.

In an embodiment, the weight parameter of each substructure in the trained multipath neural subnetwork may be synchronized to the preconstructed initial hypernetwork. Such a weight parameter synchronization can be understood as an inverse process of parameter sharing in operation 303 (FIG. 3), and an effect thereof is shown in FIG. 7. Therefore, the weight parameters of the hypernetwork may be substantially updated once, thus achieving an effect of indirectly training the hypernetwork.

In operation 104, whether the preconstructed initial hypernetwork converges is determined. If it is determined the preconstructed initial hypernetwork does not converge, operation 101 is re-executed; otherwise, training is ended and a target hypernetwork is obtained.

In an embodiment, every time when values of the weight parameters are updated, whether the preconstructed initial hypernetwork converges may be determined. In a case that the preconstructed initial hypernetwork does not converge, operation 101 is re-executed, namely the operation that the multipath neural subnetwork is acquired based on the preconstructed initial hypernetwork is continued to be executed; and in a case that the preconstructed initial hypernetwork converges, training is ended and the target hypernetwork is obtained. For example, whether a value of a loss function is less than or equal to a preset threshold may be determined. If it is determined that the value of the loss function is less than or equal to the preset threshold, it is indicated that the preconstructed initial hypernetwork does not converge, and operation 101 is re-executed; otherwise, it is indicated that the preconstructed initial hypernetwork converges, and the present initial hypernetwork is determined as the target hypernetwork.

Figure 8:
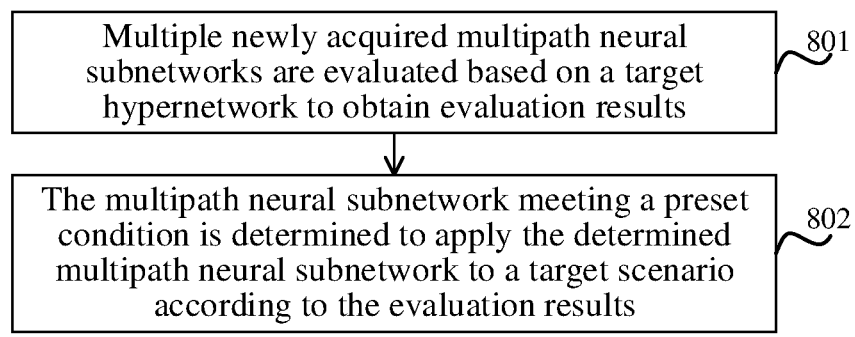
FIG. 8 is a flowchart showing a method for evaluating a multipath neural subnetwork according to an exemplary embodiment.

In an embodiment, after the target hypernetwork is obtained, in combination with the target scenario that the target hypernetwork is applied to, the hypernetwork training method may further include an operation that the multipath neural subnetwork is evaluated. FIG. 8 is a flowchart showing a method for evaluation a multipath neural subnetwork according to an exemplary embodiment. Referring to FIG. 8, based on the embodiment in FIG. 3, multiple multipath neural subnetworks may be acquired based on the target hypernetwork, and the weight parameter of each substructure in the target hypernetwork may be shared with each corresponding substructure in the multiple multipath neural subnetworks. In operation 801, the multiple newly acquired multipath neural subnetworks may be evaluated to obtain evaluation results. In operation 802, the multipath neural subnetwork meeting a preset condition may be determined to apply the determined multipath neural subnetwork to a target scenario according to the evaluation results.

The target scenario includes, but not limited to, at least one of image classification, target detection, semantic segmentation, text to speech, natural language translation and speech enhancement, which may be set according to actual requirement.

In the embodiment, the multipath neural subnetwork is sampled from the target hypernetwork and applied to the target scenario, therefore, when evaluation indexes are designed, some relative indexes, for example, model accuracy achieved by training based on a small dataset and a low resolution or model accuracy achieved after training of a small number of epochs, for the target scenario may be designed. An optimal multipath neural subnetwork of any multiple multipath neural subnetworks may be determined according to evaluation results corresponding to the relative indexes, and then may be applied to the target scenario. In other words, the preset condition may refer to an optimal value of the evaluation results of the multiple multipath neural subnetworks.

In the embodiments of the present disclosure, a multipath neural subnetwork may be acquired, then the multipath neural subnetwork may be trained to update a weight parameter of each substructure, then the weight parameter of each substructure in the multipath neural subnetwork may be synchronized to a preconstructed initial hypernetwork, and finally, when the hypernetwork converges, training may be ended and a target hypernetwork may be obtained. In such a manner, under the circumstance that a representation capability of one path is limited, the hypernetwork may be trained by use of the multipath neural subnetwork in the embodiments, so that a representation capability of the hypernetwork may be improved.

Image classification is taken as an example. It is assumed that an image training set D may be divided into N batches, each batch may include M pieces of image data, each piece of image data may correspond to a classification label and there are K types. Then, a hypernetwork may be trained by use of the image training set and the abovementioned hypernetwork training method. After training, a convergent hypernetwork may be obtained.

Subsequently, multipath neural subnetworks may be sampled from the hypernetwork, and a parameter of each substructure in the hypernetwork may be shared, thereby obtaining a performance index of each multipath neural subnetwork on the image training set.

Moreover, a subnetwork suitable for an image classification scenario may be selected from the multipath neural subnetworks according to the performance indexes and serve as a model finally used for a practical scenario.

It is to be noted that the difference between the image classification and other image, speech and natural language processing tasks is that a speech training set and another performance index evaluation method are adopted instead, other processes are similar to the abovementioned image classification model acquisition manner, and thus image, speech and natural language processing models for practical scenarios are finally obtained.

Figure 9:
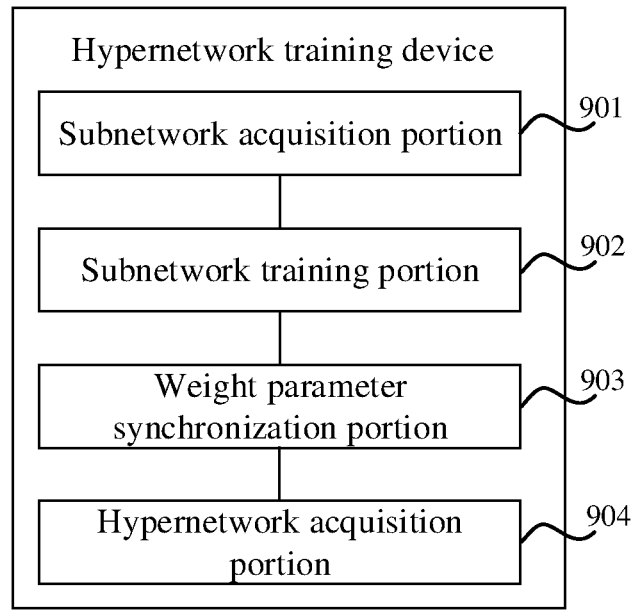
FIGS. 9-13 are block diagrams of a hypernetwork training device according to exemplary embodiments.

FIG. 9 is a block diagram of a hypernetwork training device according to an exemplary embodiment. The hypernetwork training device may include: a subnetwork acquisition portion 901 configured to acquire a multipath neural subnetwork based on a preconstructed initial hypernetwork; a subnetwork training portion 902 configured to train the multipath neural subnetwork to update a weight parameter of each substructure; a weight parameter synchronization portion 903 configured to synchronize the weight parameter of each substructure in the multipath neural subnetwork to the preconstructed initial hypernetwork; and a hypernetwork acquisition portion 904 configured to determine whether the preconstructed initial hypernetwork converges; in a case that the preconstructed initial hypernetwork does not converge, trigger the subnetwork acquisition portion and, in a case that the preconstructed initial hypernetwork converges, end training and obtain a target hypernetwork.

Figure 10:
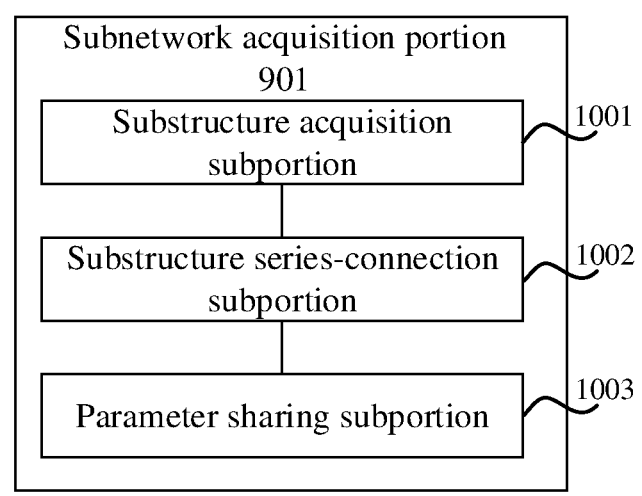

FIG. 10 is a block diagram of a hypernetwork training device according to an exemplary embodiment. Based on the hypernetwork training device shown in FIG. 9, the subnetwork acquisition portion 901 may include: a substructure acquisition subportion 1001 configured to, for each layer of the preconstructed initial hypernetwork, sample at least one substructure in each layer and add an output end configured to add an output result of the at least one substructure to obtain a substructure portion including the at least one substructure and the output end; a substructure series-connection subportion 1002 configured to connect each substructure portion in series according to a sequence of each layer to obtain an initial multipath neural subnetwork; and a parameter sharing subportion 1003 configured to perform parameter sharing on a same substructure in the preconstructed initial hypernetwork and the initial multipath neural subnetwork to obtain a final multipath neural subnetwork.

In an embodiment, the substructure acquisition subportion 1001 may be configured to sequentially sample the at least one substructure by a Bernoulli sampling method, and sample each substructure in each layer at an equal probability.

Figure 11:
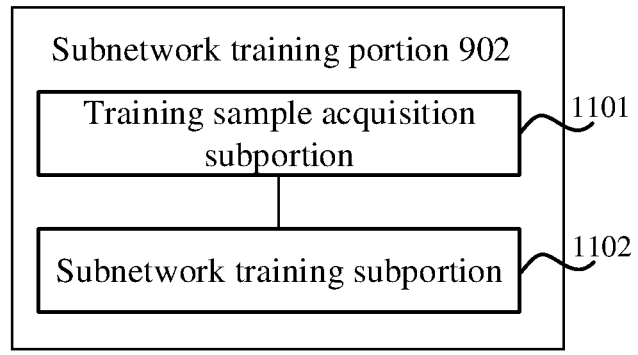

FIG. 11 is a block diagram of a hypernetwork training device according to an exemplary embodiment. Based on the hypernetwork training device shown in FIG. 9, the training portion 902 may include: a training sample acquisition subportion 1101 configured to acquire a first number of training samples in a training set; and a subnetwork training subportion 1102 configured to sequentially input the first number of training samples to the multipath neural subnetwork to train the multipath neural subnetwork until the first number of training samples are all used.

Figure 12:
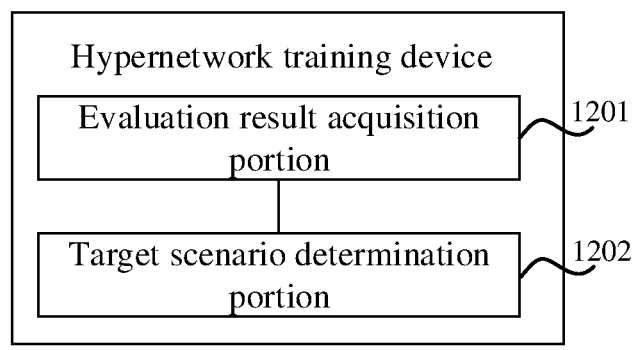

FIG. 12 is a block diagram of a hypernetwork training device according to an exemplary embodiment. Based on the hypernetwork training device shown in FIG. 9, the device may further include: an evaluation result acquisition portion 1201 configured to evaluate multiple newly acquired multipath neural subnetworks based on the target hypernetwork to obtain evaluation results; and a target scenario determination portion 1202 configured to determine the multipath neural subnetwork meeting a preset condition to apply the determined multipath neural subnetwork to a target scenario according to the evaluation results.

Figure 13:
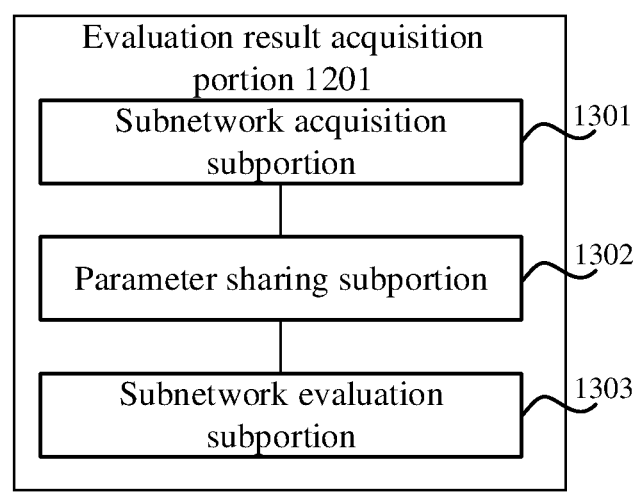

FIG. 13 is a block diagram of a hypernetwork training device according to an exemplary embodiment. Based on the hypernetwork training device shown in FIG. 12, the evaluation result acquisition portion 1201 may include: a subnetwork acquisition subportion 1301 configured to acquire the multiple multipath neural subnetworks based on the target hypernetwork; a parameter sharing subportion 1302 configured to share the weight parameter of each substructure in the target hypernetwork with each corresponding substructure in the multiple multipath neural subnetworks; and a subnetwork evaluation subportion 1303 configured to evaluate the multiple multipath neural subnetworks to obtain the evaluation results of the multiple multipath neural subnetworks.

With respect to the device in the above embodiments, the specific manners for performing operations for individual portions therein have been described in detail in the method embodiments, which will not be repeated herein.

In the embodiments of the present disclosure, a multipath neural subnetwork may be acquired, then the multipath neural subnetwork may be trained to update a weight parameter of each substructure, subsequently, the weight parameter of each substructure in the multipath neural subnetwork may be synchronized to the preconstructed initial hypernetwork, and finally, when the hypernetwork converges, training may be ended and a target hypernetwork may be obtained. In such a manner, under the circumstance that a representation capability of one path is limited, the hypernetwork may be trained by use of the multipath neural subnetwork in the embodiments, so that a representation capability of the hypernetwork is improved.

Figure 14:
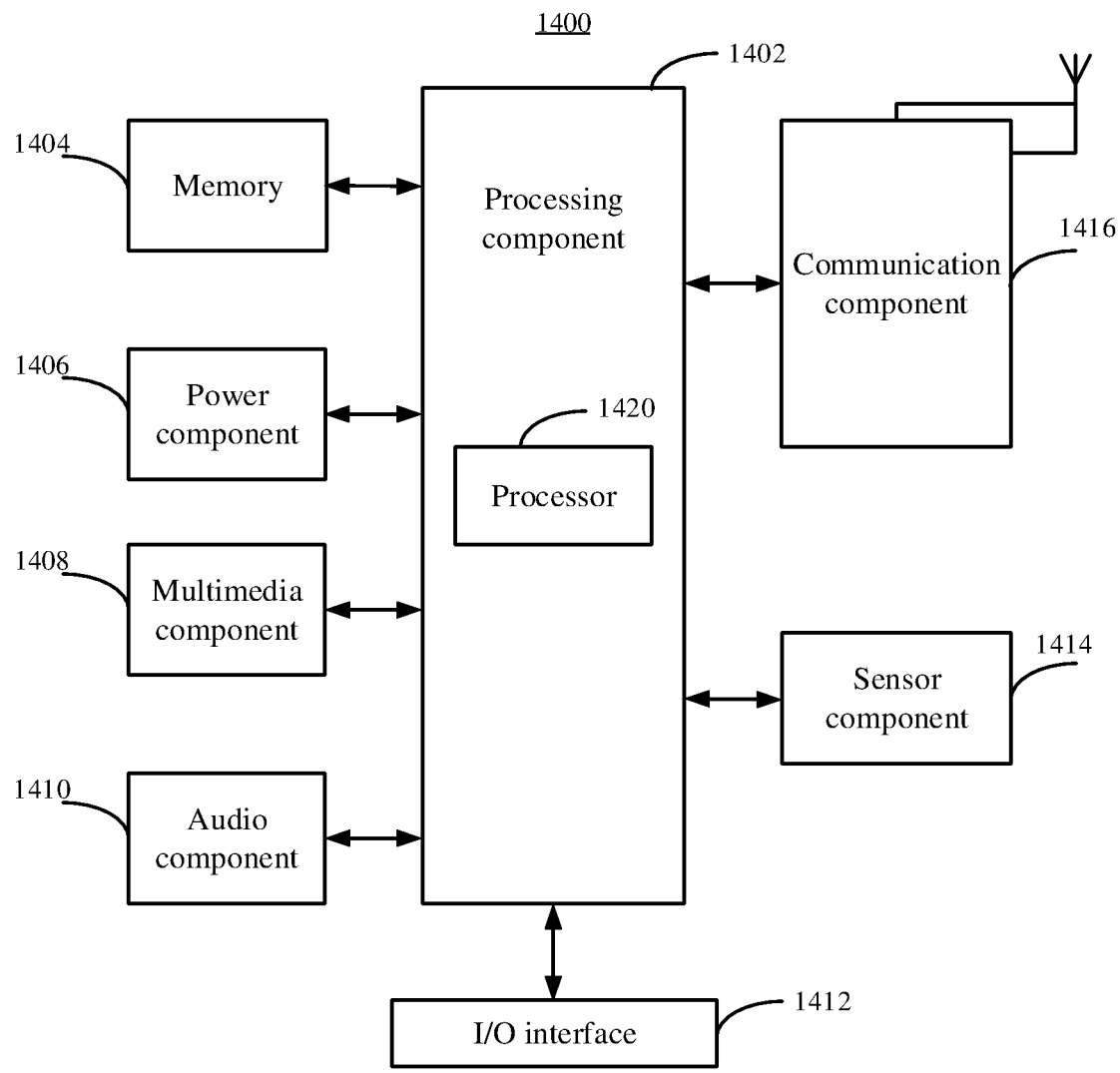
FIG. 14 is a block diagram of an electronic device according to an exemplary embodiment.

FIG. 14 is a block diagram of an electronic device 1400 according to an exemplary embodiment. For example, the electronic device 1400 may be a smart phone, a computer, a digital broadcast terminal, a tablet, a medical device, exercise equipment, a personal digital assistant and the like.

The electronic device 1400 may include one or more of the following components: a processing component 1402, a memory 1404, a power component 1406, a multimedia component 1408, an audio component 1410, an Input/Output (I/O) interface 1412, a sensor component 1414, a communication component 1416 and an image acquisition component 1418.

The processing component 1402 is typically configured to control overall operations of the electronic device 1400, such as the operations associated with display, telephone calls, data communications, camera operations, and recording operations. The processing component 1402 may include one or more processors 1420 to execute instructions. Moreover, the processing component 1402 may include one or more portions which facilitate interaction between the processing component 1402 and the other components. For instance, the processing component 1402 may include a multimedia portion to facilitate interaction between the multimedia component 1408 and the processing component 1402.

The memory 1404 is configured to store various types of data to support the operation of the electronic device 1400. Examples of such data include instructions for any application programs or methods operated on the electronic device 1400, contact data, phonebook data, messages, pictures, video, etc. The memory 1404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 is configured to provide power for various components of the electronic device 1400. The power component 1406 may include a power management system, one or more power supplies, and other components associated with generation, management and distribution of power for the electronic device 1400.

The multimedia component 1408 may include a screen providing an output interface between the electronic device 1400 and a target object. In some embodiments, the screen may include a Liquid Crystal Display (LCD) and a Touch Panel (TP). In a case that the screen includes the TP, the screen may be implemented as a touch screen to receive an input signal from the target object. The TP includes one or more touch sensors to sense touches, swipes and gestures on the TP. The touch sensors may not only sense a boundary of a touch or swipe action but also detect a duration and pressure associated with the touch or swipe action.

The audio component 1410 is configured to output and/or input an audio signal. For example, the audio component 1410 may include a Microphone (MIC), and the MIC is configured to receive an external audio signal when the electronic device 1400 is in the operation mode, such as a call mode, a recording mode and a voice recognition mode. The received audio signal may further be stored in the memory 1404 or sent through the communication component 1416. In some embodiments, the audio component 1410 further includes a speaker configured to output the audio signal.

The I/O interface 1412 is configured to provide an interface between the processing component 1402 and a peripheral interface portion, and the peripheral interface portion may be a keyboard, a click wheel, a button and the like.

The sensor component 1414 may include one or more sensors configured to provide status assessment in various aspects for the electronic device 1400. For instance, the sensor component 1414 may detect an on/off status of the electronic device 1400 and relative positioning of components, such as a display screen and small keyboard of the electronic device 1400, and the sensor component 1414 may further detect a change in a position of the electronic device 1400 or a component, presence or absence of contact between the target object and the electronic device 1400, orientation or acceleration/deceleration of the electronic device 1400 and a change in temperature of the electronic device 1400.

The communication component 1416 is configured to facilitate wired or wireless communication between the electronic device 1400 and another device. The electronic device 1400 may access a communication-standard-based wireless network, such as a Wireless Fidelity (WiFi) network, a 4th-Generation (4G) or 5th-Generation (5G) network or a combination thereof. In an exemplary embodiment, the communication component 1416 receives a broadcast signal or broadcast associated information from an external broadcast management system through a broadcast channel. In an exemplary embodiment, the communication component 1416 further includes a Near Field Communication (NFC) portion to facilitate short-range communication. In an exemplary embodiment, the communication component 1416 may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the electronic device 1400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

Other implementations of the present disclosure will be apparent to those skilled in the art from consideration of the specification and practice of the present disclosure. This present disclosure is intended to cover any variations, uses, or adaptations following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A hypernetwork training method, comprising:
    acquiring a multipath neural subnetwork based on a preconstructed initial hypernetwork;
    training the multipath neural subnetwork to update a weight parameter of each substructure in the multipath neural subnetwork;
    synchronizing the weight parameter of each substructure in the multipath neural subnetwork to the preconstructed initial hypernetwork; and
    determining whether the preconstructed initial hypernetwork converges, and if it is determined that the preconstructed initial hypernetwork does not converge, re-executing the acquiring, the training, the synchronizing, and the determining, to obtain a target hypernetwork.

2. The hypernetwork training method of claim 1, wherein the acquiring the multipath neural subnetwork based on the preconstructed initial hypernetwork comprises:

for each layer of the preconstructed initial hypernetwork, sampling at least one substructure in each layer, and adding an output end configured to add an output result of the at least one substructure to obtain a substructure portion comprising the at least one substructure and the output end;

connecting each substructure portion in series according to a sequence of each layer to obtain an initial multipath neural subnetwork; and performing parameter sharing on a same substructure in the preconstructed initial hypernetwork and the initial multipath neural subnetwork to obtain a final multipath neural subnetwork.

3. The hypernetwork training method of claim 2, wherein the sampling the at least one substructure in each layer comprises: sequentially sampling the at least one substructure by a Bernoulli sampling method, wherein each substructure in each layer is sampled at an equal probability.

4. The hypernetwork training method of claim 1, wherein the training the multipath neural subnetwork comprises:
acquiring a first number of training samples in a training set; and
sequentially inputting the first number of training samples to the multipath neural subnetwork to train the multipath neural subnetwork until the first number of training samples are all used.

5. The hypernetwork training method of claim 1, further comprising:
evaluating multiple multipath neural subnetworks, which are newly acquired, based on the target hypernetwork to obtain evaluation results; and
determining a multipath neural subnetwork meeting a preset condition to apply the determined multipath neural subnetwork to a target scenario according to the evaluation results.

6. The hypernetwork training method of claim 5, wherein the evaluating the multiple multipath neural subnetworks, which are newly acquired, based on the target hypernetwork to obtain the evaluation results comprises:
acquiring the multiple multipath neural subnetworks based on the target hypernetwork;
sharing a weight parameter of each substructure in the target hypernetwork with each corresponding substructure in the multiple multipath neural subnetworks; and
evaluating the multiple multipath neural subnetworks to obtain the evaluation results of the multiple multipath neural subnetworks.

7. The hypernetwork training method of claim 5, wherein the target scenario comprises at least one of image classification, target detection, semantic segmentation, text to speech, natural language translation, and speech enhancement.

8. An electronic device, comprising:
a processor; and
a memory configured to store instructions executable by the processor,
wherein the processor is configured to:
acquire a multipath neural subnetwork based on a preconstructed initial hypernetwork;
train the multipath neural subnetwork to update a weight parameter of each substructure in the multipath neural subnetwork;
synchronize the weight parameter of each substructure in the multipath neural subnetwork to the preconstructed initial hypernetwork; and
determine whether the preconstructed initial hypernetwork converges, and if it is determined that the preconstructed initial hypernetwork does not converge, re-execute the acquiring, the training, the synchronizing, and the determining, to obtain a target hypernetwork.

9. The electronic device of claim 8, wherein the processor is further configured to:
for each layer of the preconstructed initial hypernetwork, sample at least one substructure in each layer and add an output end configured to add an output result of the at least one substructure to obtain a substructure portion comprising the at least one substructure and the output end;
connect each substructure portion in series according to a sequence of each layer to obtain an initial multipath neural subnetwork; and
perform parameter sharing on a same substructure in the preconstructed initial hypernetwork and the initial multipath neural subnetwork to obtain a final multipath neural subnetwork.

10. The electronic device of claim 9, wherein the processor is further configured to sequentially sample the at least one substructure by a Bernoulli sampling method, wherein each substructure in each layer is sampled at an equal probability.

11. The electronic device of claim 8, wherein the processor is further configured to:
acquire a first number of training samples in a training set; and
sequentially input the first number of training samples to the multipath neural subnetwork to train the multipath neural subnetwork until the first number of training samples are all used.

12. The electronic device of claim 8, wherein the processor is further configured to:
evaluate multiple multipath neural subnetworks, which are newly acquired, based on the target hypernetwork to obtain evaluation results; and
determine a multipath neural subnetwork meeting a preset condition, to apply the determined multipath neural subnetwork to a target scenario according to the evaluation results.

13. The electronic device of claim 12, wherein the processor is further configured to:
acquire the multiple multipath neural subnetworks based on the target hypernetwork;
share a weight parameter of each substructure in the target hypernetwork with each corresponding substructure in the multiple multipath neural subnetworks; and
evaluate the multiple multipath neural subnetworks to obtain the evaluation results of the multiple multipath neural subnetworks.

14. The electronic device of claim 12, wherein the target scenario comprises at least one of image classification, target detection, semantic segmentation, text to speech, natural language translation, and speech enhancement.

15. A non-transitory readable storage medium having stored thereon instructions that, when executed by a processor of a device, cause the device to perform a hypernetwork training method, the method comprising:
acquiring a multipath neural subnetwork based on a preconstructed initial hypernetwork;
training the multipath neural subnetwork to update a weight parameter of each substructure in the multipath neural subnetwork;
synchronizing the weight parameter of each substructure in the multipath neural subnetwork to the preconstructed initial hypernetwork; and determining whether the preconstructed initial hypernetwork converges, and if it is determined that the preconstructed initial hypernetwork does not converge, re-executing the acquiring, the training, the synchronizing, and the determining, to obtain a target hypernetwork.

16. The non-transitory readable storage medium according to claim 15, wherein the acquiring the multipath neural subnetwork based on the preconstructed initial hypernetwork comprises:

for each layer of the preconstructed initial hypernetwork, sampling at least one substructure in each layer and adding an output end configured to add an output result of the at least one substructure to obtain a substructure portion comprising the at least one substructure and the output end;

connecting each substructure portion in series according to a sequence of each layer to obtain an initial multipath neural subnetwork; and performing parameter sharing on a same substructure in the preconstructed initial hypernetwork and the initial multipath neural subnetwork to obtain a final multipath neural subnetwork.

17. The non-transitory readable storage medium according to claim 16, wherein the sampling the at least one substructure in each layer comprises: sequentially sampling the at least one substructure by a Bernoulli sampling method, wherein each substructure in each layer is sampled at an equal probability.

18. The non-transitory readable storage medium according to claim 15, wherein the training the multipath neural subnetwork comprises:

acquiring a first number of training samples in a training set; and sequentially inputting the first number of training samples to the multipath neural subnetwork to train the multipath neural subnetwork until the first number of training samples are all used.

19. The non-transitory readable storage medium according to claim 15, wherein the method further comprises:

evaluating multiple multipath neural subnetworks, which are newly acquired, based on the target hypernetwork to obtain evaluation results; and determining a multipath neural subnetwork meeting a preset condition, to apply the determined multipath neural subnetwork to a target scenario according to the evaluation results.

20. The non-transitory readable storage medium according to claim 19, wherein the evaluating the multiple multipath neural subnetworks, which are newly acquired, based on the target hypernetwork to obtain the evaluation results comprises:

acquiring the multiple multipath neural subnetworks based on the target hypernetwork;

sharing a weight parameter of each substructure in the target hypernetwork with each corresponding substructure in the multiple multipath neural subnetworks; and evaluating the multiple multipath neural subnetworks to obtain the evaluation results of the multiple multipath neural subnetworks.

\* \* \* \* \*